(12) United States Patent
O'Dell

(10) Patent No.: US 7,408,537 B2
(45) Date of Patent: Aug. 5, 2008

(54) USING A MATRIX INPUT TO IMPROVE STROKE-ENTRY OF CHINESE CHARACTERS INTO A COMPUTER

(76) Inventor: Robert B. O'Dell, 602 Calmar Ave., Oakland, CA (US) 94610

( * ) Notice: Subject to any disclaimer, the term of this patent is extended or adjusted under 35 U.S.C. 154(b) by 575 days.

(21) Appl. No.: 10/973,813

(22) Filed: Oct. 25, 2004

(65) Prior Publication Data

US 2005/0156899 A1    Jul. 21, 2005

Related U.S. Application Data

(60) Provisional application No. 60/514,056, filed on Oct. 25, 2003.

(51) Int. Cl.
*G06F 3/02* (2006.01)
*G09G 5/00* (2006.01)

(52) U.S. Cl. .................................. 345/171; 382/185
(58) Field of Classification Search ................. 345/156, 345/168, 169, 171; 341/28; 382/185
See application file for complete search history.

(56) References Cited

U.S. PATENT DOCUMENTS

| | | | | |
|---|---|---|---|---|
| 5,895,906 A | * | 4/1999 | Danielson et al. | 235/462.45 |
| 5,914,481 A | * | 6/1999 | Danielson et al. | 235/462.15 |
| 2004/0080487 A1 | * | 4/2004 | Griffin et al. | 345/156 |
| 2006/0236239 A1 | * | 10/2006 | Simpson et al. | 715/531 |

* cited by examiner

*Primary Examiner*—Ricardo L Osorio

(57) ABSTRACT

A method and system for entering Chinese characters into a computer by entering the size and shape of their strokes via a matrix, such as the 3×3 arrangement of the numbers one through nine found on a cell phone.

9 Claims, 13 Drawing Sheets

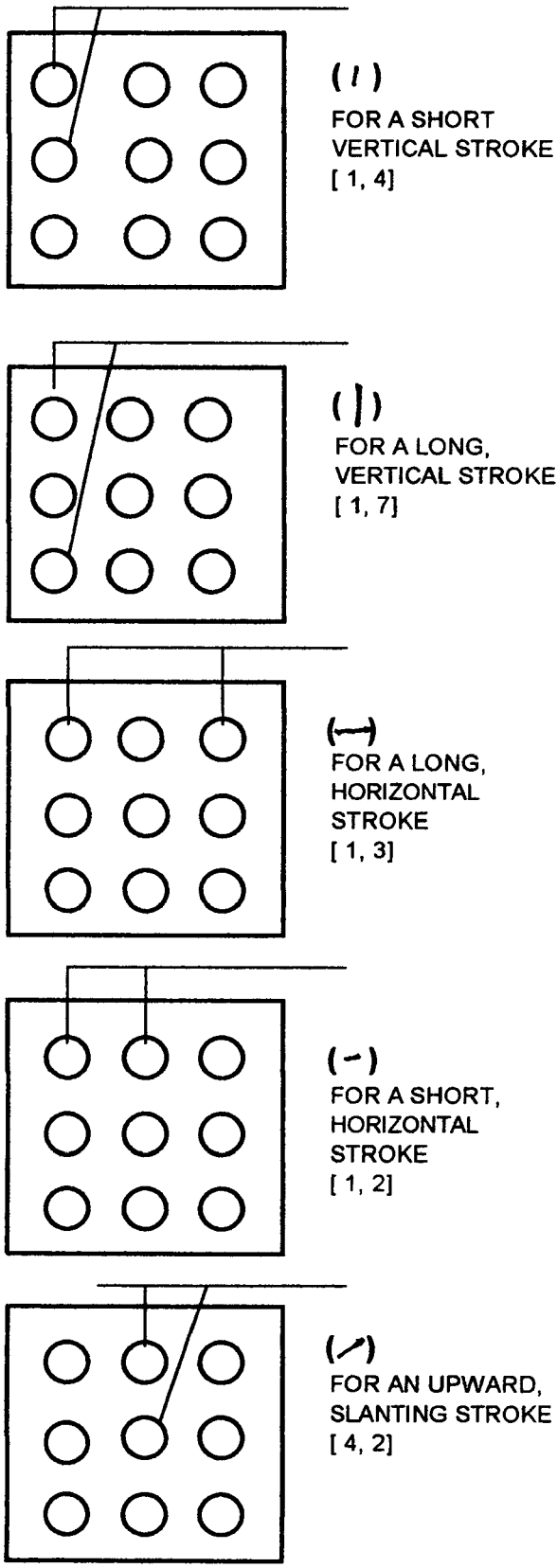

FIGURE 3C

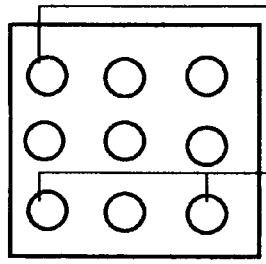
( L ) LOWER LEFT CORNER STROKE WITH LONG VERTICAL AND LONG HORIZONTAL [ 1, 7, 9 ]

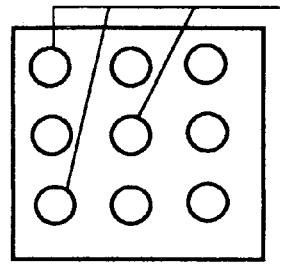
( ↓ ) LOWER LEFT CORNER STROKE WITH LONG VERTICAL AND SLANT UPWARD [ 1, 7, 5 ]

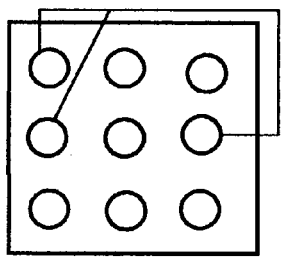
( ∟ ) LOWER LEFT CORNER STROKE WITH SHORT VERTICAL AND LONG HORIZONTAL [ 1, 4, 6 ]

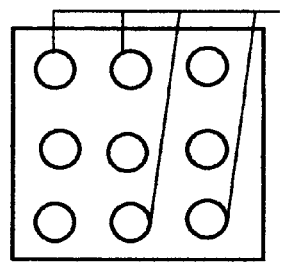
( ㄱL ) TWO-CORNERED STROKE OF HORIZONTALS AND VERTICALS [ 1, 2, 8, 9 ]

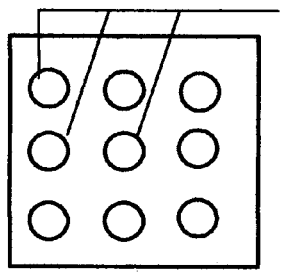
( L ) LOWER LEFT CORNER STROKE WITH SHORT VERTICAL AND SHORT HORIZONTAL [ 1, 4, 5 ]

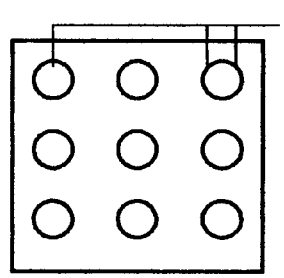
( ⟶ ) LONG HORIZONTAL WITH HOOK AT THE END [ 1, 3, 3 ]

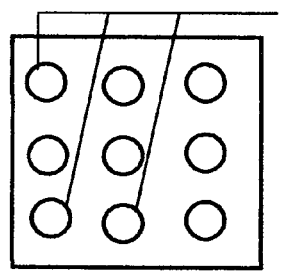
( L ) LOWER LEFT CORNER STROKE WITH LONG VERTICAL AND SHORT HORIZONTAL [ 1, 7, 8 ]

FIGURE 3D
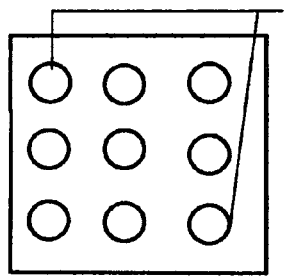
( \ )
LONG
RIGHT-SLANTED
DOWNWARD
STROKE
[ 1, 9 ]
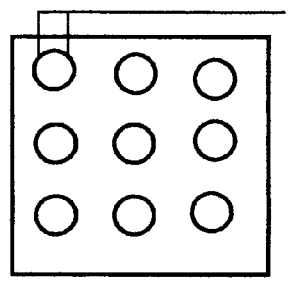
( ´ )
VERY SHORT
LEFT-SLANTED
DOWNWARD
STROKE
[ 1, 1 ]
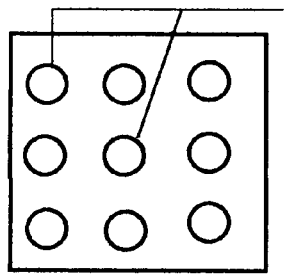
( \ )
SHORT
RIGHT-SLANTED
DOWNWARD
STROKE
[ 1, 4 ]
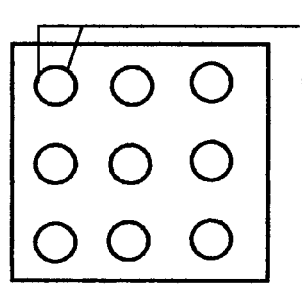
( ` )
VERY SHORT
RIGHT-SLANTED
DOWNWARD
STROKE
[ 1, 1 ]
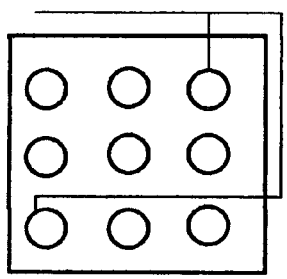
( / )
LONG
LEFT-SLANTED
DOWNWARD
STROKE
[ 3, 7 ]
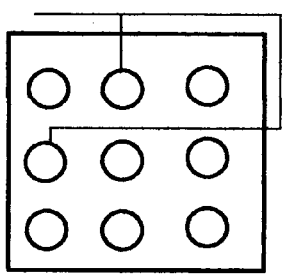
( ´ )
SHORT
LEFT-SLANTED
DOWNWARD
STROKE
[ 2, 4 ]

FIGURE 4
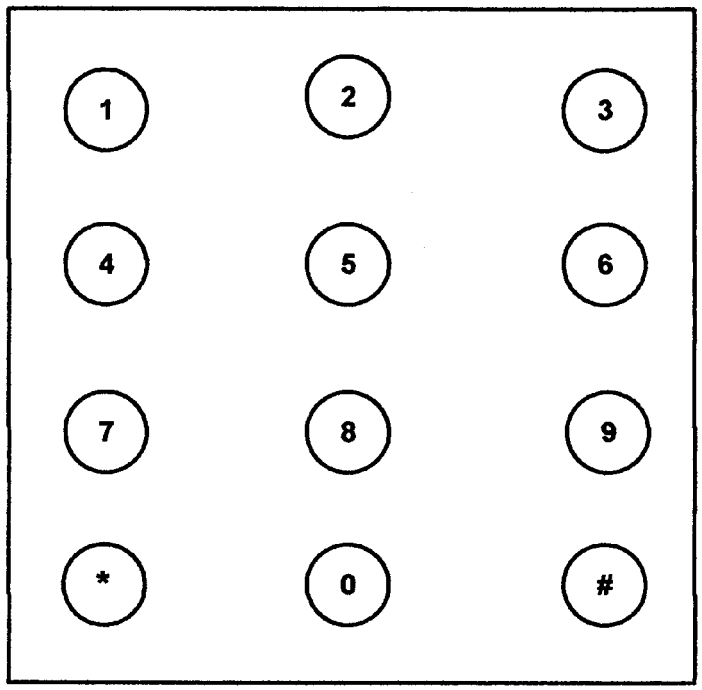
ALL STROKES, IN ORDER,
FOR THE CHARACTER:
 :
[ 1, 7 ] + [ 1, 3, 9 ] + [ 1, 4 ] +
[ 1, 2, 5 ] + [ 1, 2 ] + [ 1, 3 ]

FIGURE 5
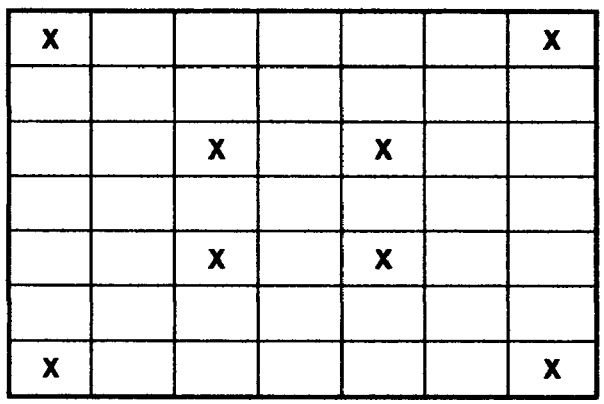
[ 1, 43 ] + [ 1, 7, 49 ] + [ 17, 31 ] +
[ 19, 33 ] + [ 31, 33 ] + [ 43, 49 ]
ALL STROKES, IN ORDER,
FOR THE CHARACTER: 

141399

FIGURE 8
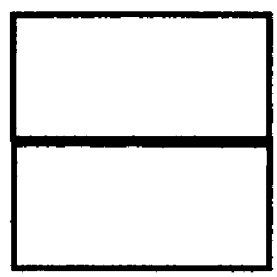 1 7 1 3 9
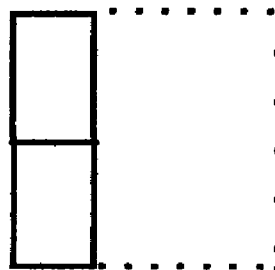 1 7 1 2 8
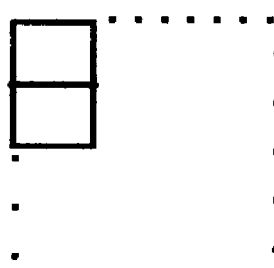 1 4 1 2 5
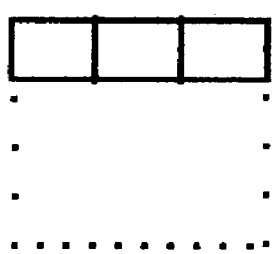 1 4 1 3 6

FIGURE 9
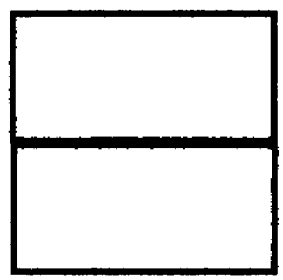 E 1 7 1 3 9
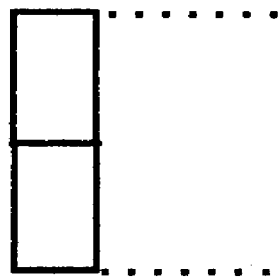 B 1 7 1 2 8
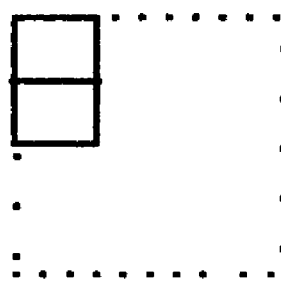 C 1 4 1 2 5
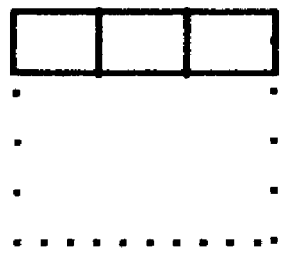 A 1 4 1 3 6

USING A MATRIX INPUT TO IMPROVE STROKE-ENTRY OF CHINESE CHARACTERS INTO A COMPUTER

This application claims priority of provisional patent application 60/514,056, filed Oct. 25, 2003.

BACKGROUND OF THE INVENTION

The present invention relates to entering text into a computer. More particularly to entering Chinese characters using stroke input.

Stroke-input is an approach to entering Chinese characters into a computer that has been widely used on limited keyboard cell phones. The strokes that are used to make characters are grouped into logical categories which are indicated on the keys. For example, all vertical strokes are in a single category. To display a given character, the user presses the proper category keys in the same order in which the strokes that make up that character are written with a pen or pencil. No incomplete character reflecting input is displayed. As each key is pressed, the user is presented with a group of, perhaps, six possible complete characters, ranked according to frequency-of-use statistics. If the user does not see the desired character, he enters another stroke, or can ask for the next most likely group of six complete characters. Although they are the result of the same keypresses, many of these complete characters have a variety of differences, including the look of the first few strokes. This is a natural result of strokes of various locations, sizes, and, in some cases, various shapes being lumped into the same category. This can be especially disconcerting to the beginner, and offers very little reassurance to the experienced user that he has not made an entry error. This further complicates input for the many users who complain that they have forgotten the stroke order or the exact look of the character until they see it. In such cases, the best option for the user is to enter a few strokes then look at the groups of complete characters until they find the desired character. Yet there can be dozens or even hundreds of characters to look through unless the character is one that is frequently used. But, of course, the most frequently used characters are the images least likely to be forgotten by the users. Another, more modest problem, is found among the new users, who must accept and remember the stroke groupings and get accustomed to the location of the keys for the various categories.

SUMMARY

Rather than denying significant differences between all possible strokes used in writing Chinese characters by placing them in a few categories which are accessible from a small number of keys such as those found on a telephone keypad, the present invention offers matrix-input of strokes. This makes it possible for the user of a telephone keypad to indicate the size and shape of any stroke entered by using keypresses to indicate size and shape of strokes. Stroke size and stroke shape make possible an improved offering of complete and incomplete characters after each stroke entry, and obviates the need for a user to learn and remember on which keys the various stroke categories are located and which strokes belong in which category.

The use of matrices larger than that seen on a telephone keypad makes it possible also to indicate not only information on size and shape of the stroke but stroke position within the imaginary character box which contains the character. The matrices larger than that seen on a telephone keypad also make it possible for the user to enter information on strokes anywhere within the imaginary character box, which makes it possible for the user to enter the character even if the user does not remember all of the character.

A display of character boxes with certain areas of the boxes given visual emphasis makes it possible for a user of matrix input with a matrix of a size including that matrix seen on a telephone keypad to select one such box prior to entering stroke information and therefore narrow the possibilities created by the user's subsequent entry of stroke information. Such character boxes with certain areas given visual emphasis can also be used to improve the efficiency of existing stroke-category input techniques seen in prior art, including that of O'Dell [U.S. Pat. No. 5,109,352].

DESCRIPTION OF THE DRAWINGS

FIGS. 3A, 3B, 3C & 3D show key selection for a variety of strokes using matrix input on 9 keys of telephone keypad.

FIG. 4 shows matrix input for each stroke of a particular character using the matrix available on 9 keys of a telephone keypad.

FIG. 5 shows matrix input for each stroke of a particular character on a matrix larger than that a available on a telephone keypad.

FIG. 8 shows the input data strings for the first two strokes of the characters shown—fully or partly to the left of their data strings—using matrix stroke input on a telephone pad, without first selecting one of the character boxes shown in FIG. 6.

FIG. 9 shows the input data strings for the first two strokes of the same characters shown in FIG. 8 using matrix stroke input on a telephone pad after first selecting one of the character boxes shown in FIG. 6.

DETAILED DISCUSSION OF THE INVENTION

Figure 1:
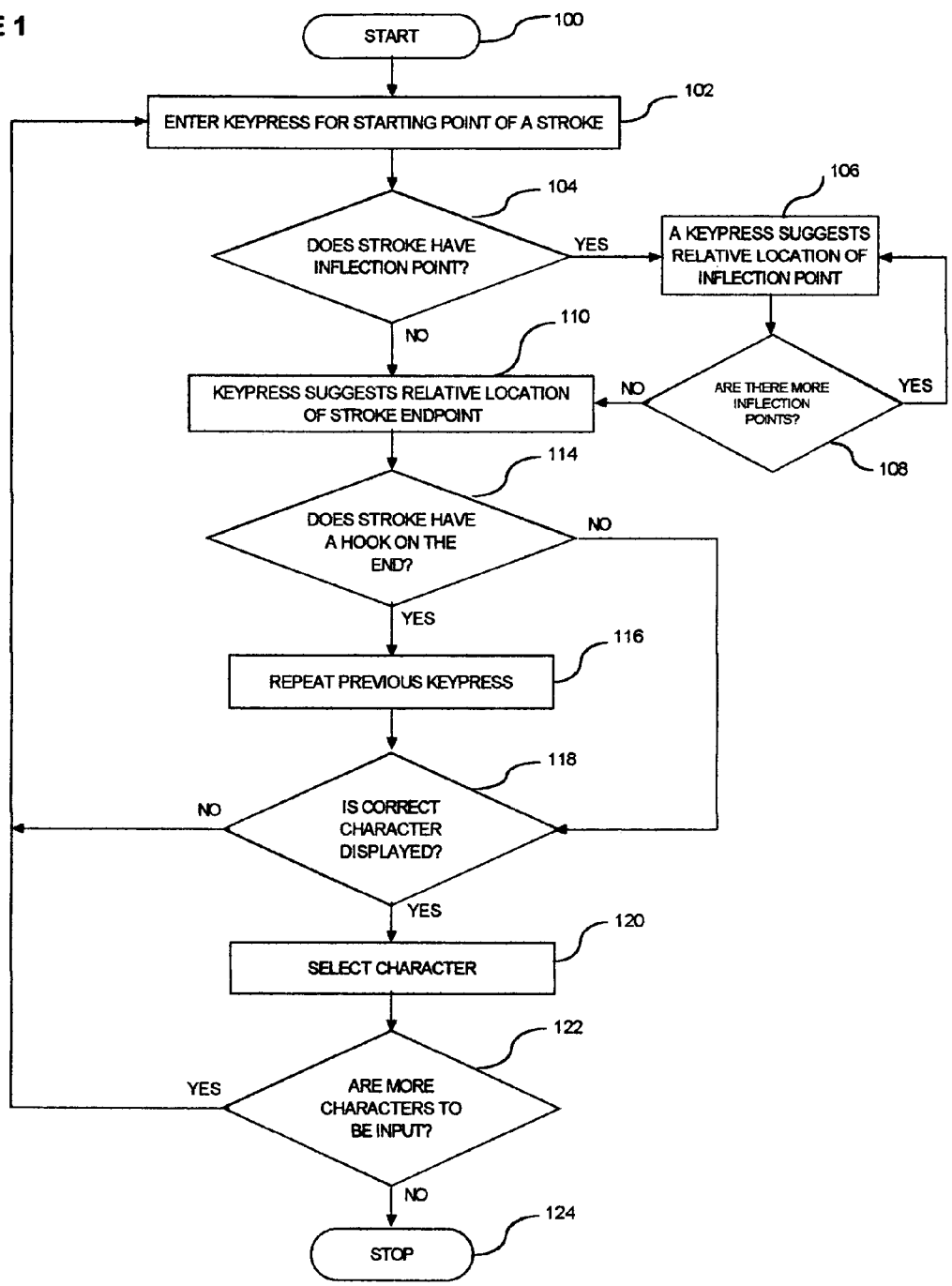
FIG. 1 is a logic flow diagram illustrating the steps used in matrix input on a telephone keypad.

The present invention will now be described in detail with reference to a few preferred embodiments thereof as illustrated in the accompanying drawings. In the following description, numerous specific details are set forth in order to provide a thorough understanding of the present invention. It will be apparent to one skilled in the art, that the present invention may be practiced without some or all of these specific details. In other instances, well-known process steps have not been described in detail in order to not unnecessarily obscure the present invention. The features and advantages of the present invention may be better understood with reference to the discussion that follows and to the drawings. FIG. 1 provides an overview of the process flow of the embodiment.

Figure 2:
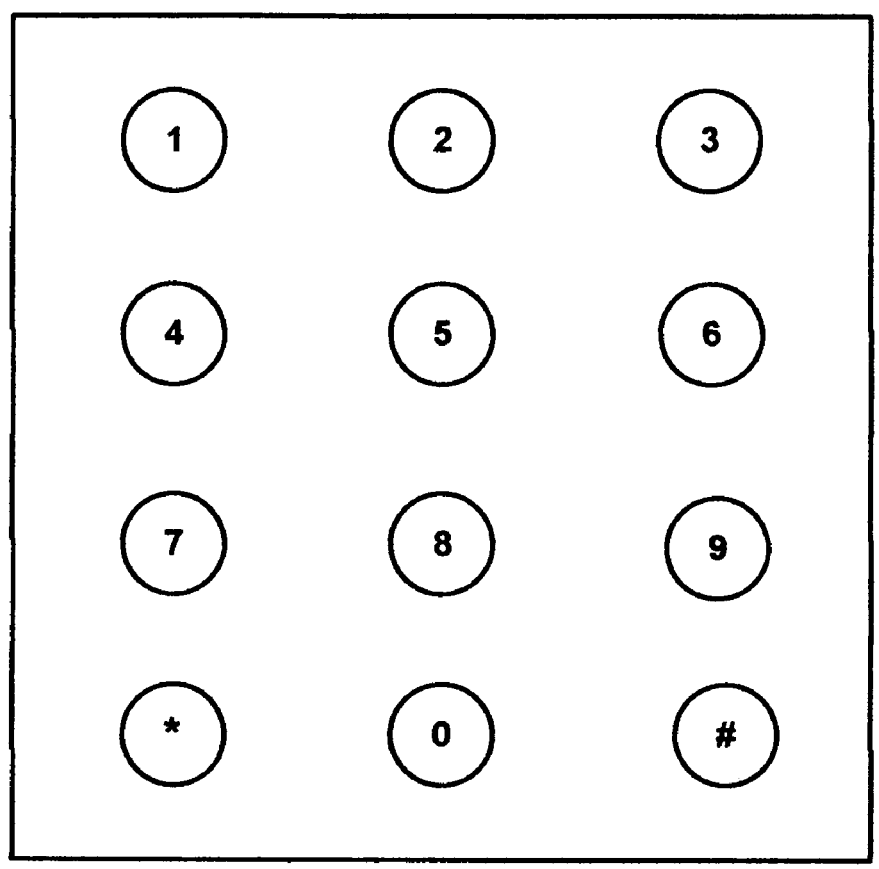
FIG. 2 shows a telephone keypad with the usual arrangement of numbers and other images displayed on the keys.
Figure 3B:
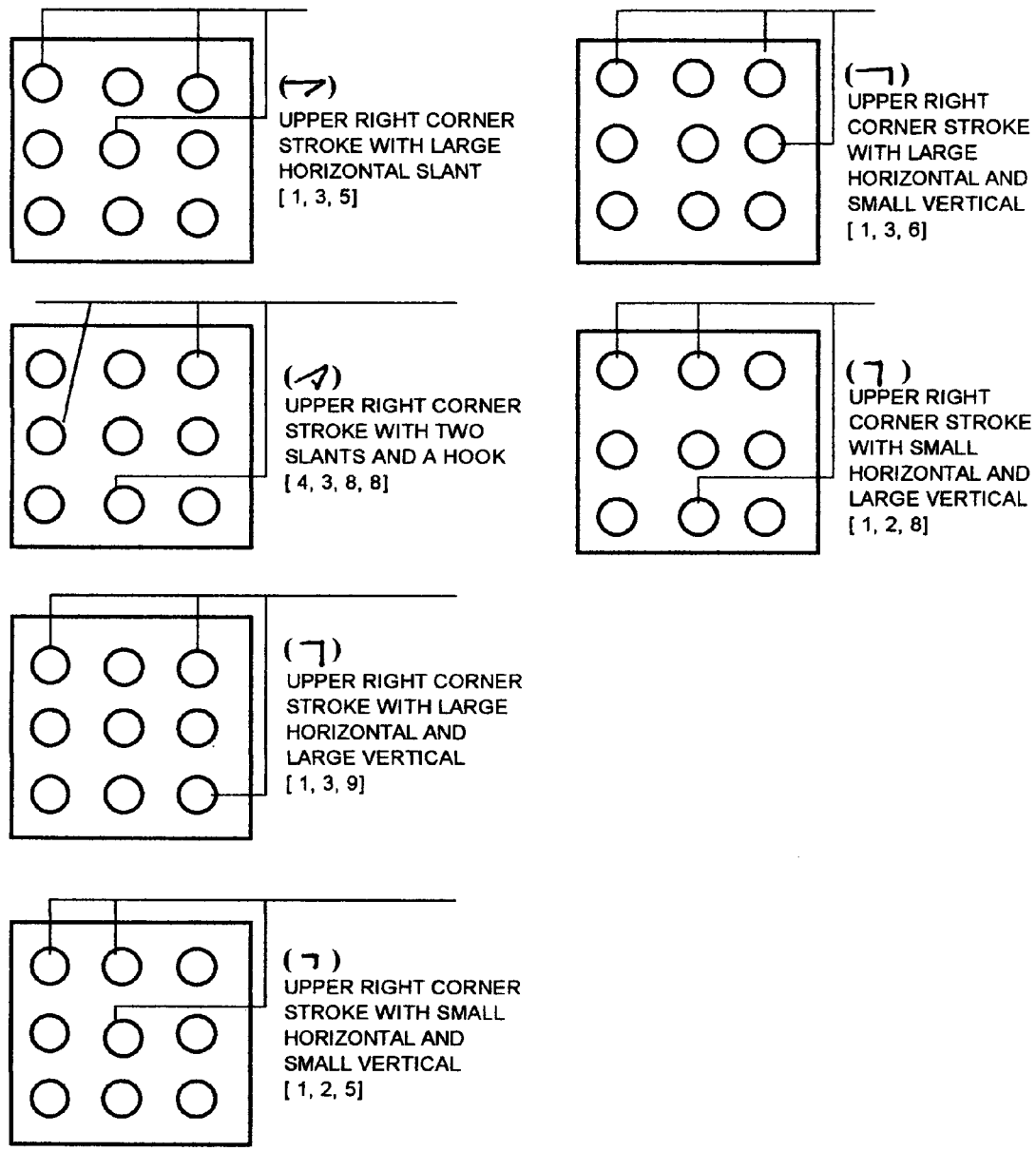

In the preferred embodiment the keys numbered one through nine of a telephone keypad (FIG. 2) are used as a matrix to input the strokes of Chinese characters. Keypresses suggest both size and shape of the strokes entered, including straight strokes, curving strokes and strokes with one or more sharp turns—or inflections. Keypresses used to indicate many such strokes are illustrated in FIGS. 3A, 3B and 3C.

Except for strokes that start by being drawn down and to the left including [ ], [ ], [ ] and [ ], and an upward stroke [ ] stroke entry begins in step 102 with a press of the 1 key. If there are no inflection points in the stroke or hooks on the end of the stroke the next keypress both completes input of the stroke and, by moving two key spaces or only one for the next keypress suggests the size of the stroke. So, to enter a stroke, the user begins by pressing a matrix key step 102, usually the 1 key. If user decides in step 104 that the desired stroke has one or more corners or turnings, the user then in step 106 presses a key suggesting the relative location of the first corner or turning point (an inflection point). If the user determines in step 108 that there are no more inflection points, then a keypress is entered in step 112 that suggests the relative location of the endpoint. If the user had decided in step 104 that there were no inflection points in the stroke, then a keypress in step 110 would have suggested the end point of the stroke as well as its relative length. Whether there were inflection points or not, it is necessary still to ask in step 114 whether the stroke has a hook on the end. If the stroke has a hook on the end, the previous keypress is repeated one time in step 116. Whether the stroke ended with a hook or not, input of the stroke is now complete, and if it is decided in step 120 that the correct character is now displayed, the character is selected. If the correct character is not displayed, the user enters a keypress to begin entry of the next stroke, and the process begins again in step 102. Or, as is well-known in the art, the user can be offered additional groups of possible characters. If the correct character is displayed and selected, and there are more characters to be input, stroke entry begins again in step 102. If there are no more characters to input, the process stops at step 124.

To enter the character [ ], shown in FIG. 5, the user first presses the 1 key, then the 7 key, which completes entry for the first large vertical stroke. Next the user presses the 1 key, then, because the next stroke is a large upper right corner stroke, the user presses the 3 key, then the 9 key, and the second stroke [ ] is complete. Now, in order to enter the third stroke, the small vertical stroke on the inside of the character, the user presses the 1 key followed by the 4 key and entry is complete for that [ ] stroke. To enter the third stroke [ ], the user presses the 1 key followed by the 2 key, since it is a small upper right corner stroke, then completes the stroke by pressing the 5 key. The next stroke is a small straight horizontal which completes the character's small internal rectangle. That small straight horizontal stroke is entered by pressing the 1 key, followed by the 2 key, which completes the stroke. The next stroke is the last one needed to complete the character. It is the long horizontal stroke at the bottom of the character and is entered by first pressing the 1 key, then pressing the 3 key. The character is now complete, and entry for the next character can begin.

Figure 7:
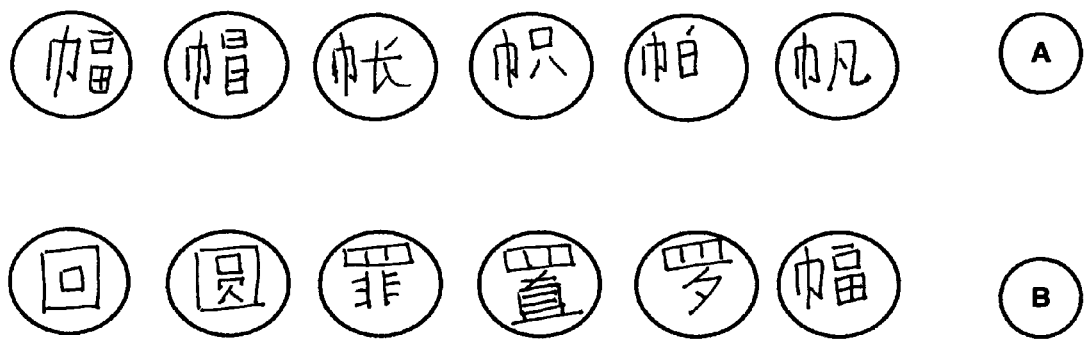
FIG. 7 shows the display of possible characters after matrix entry (A) of three specific strokes on a telephone keypad as compared to the possible characters displayed (B) using existing stroke-category input techniques.
Figure 13:
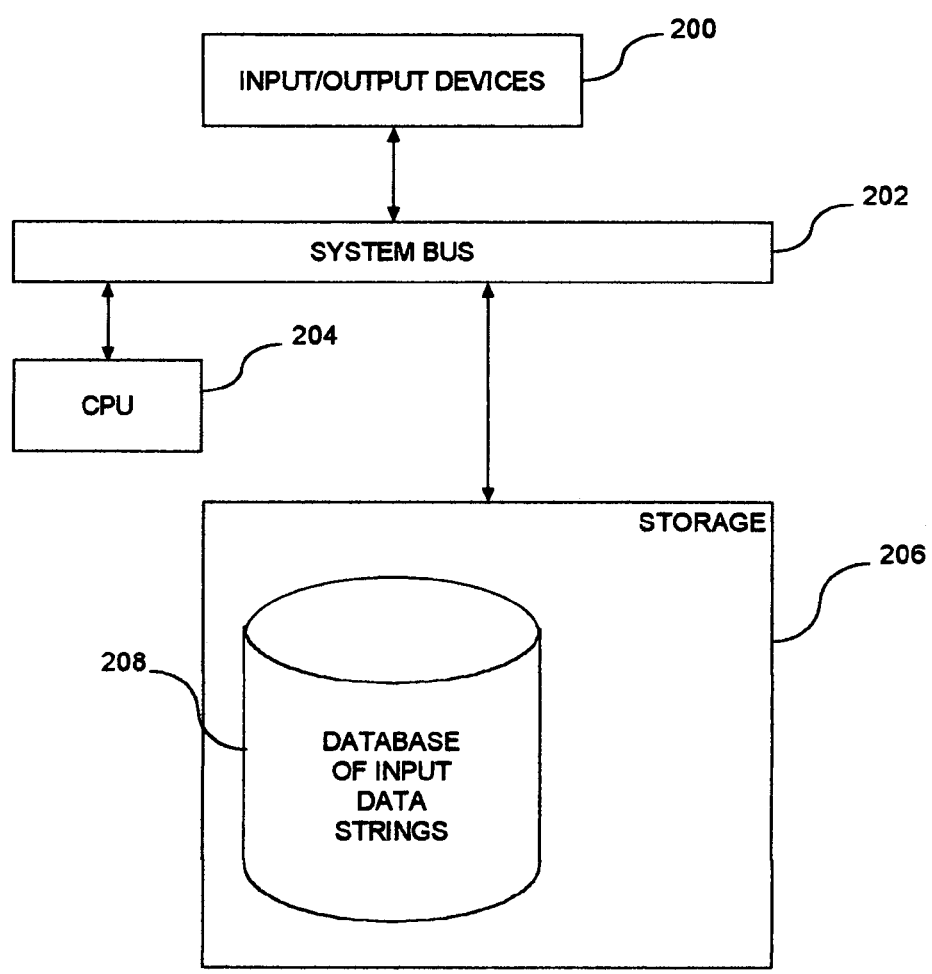
FIG. 13 is a block diagram of a computer apparatus for computer entry of Chinese characters using matrix input in accordance with the invention.

In the preceding example, all six strokes of the character were entered in order to show stroke entry for every stroke in a character. However, it would not have been necessary to enter all of the character's strokes, because a group of likely characters is displayed for possible selection after each stroke entry. Complete entry of all strokes is rarely necessary, even for characters of few strokes. And, with this matrix entry, it is common that the character selection displayed after each stroke is entered will much more quickly offer the desired character than is seen with existing stroke-category entry techniques as is seen in FIG. 7. This results because the matrix entry provides more stroke information.

Figure 6:
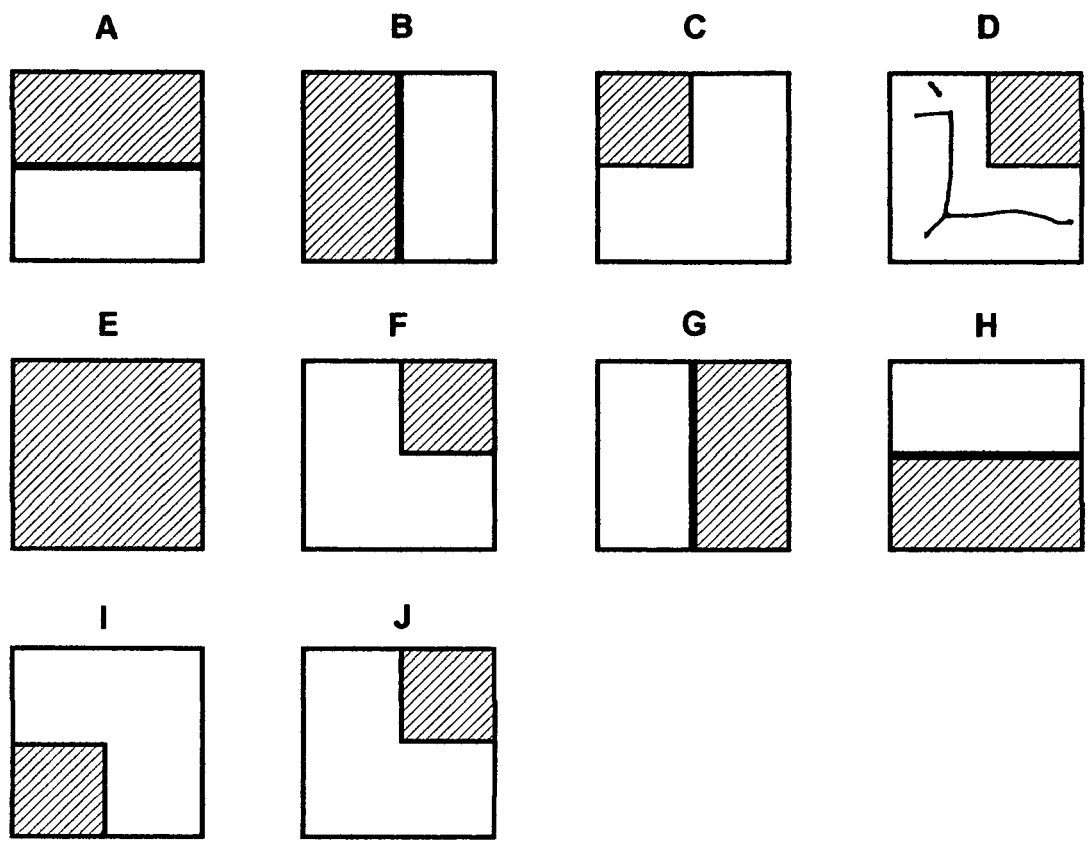
FIG. 6 shows character boxes with certain areas given visual emphasis.

In another embodiment, entering the strokes of a character is preceded by a selection of one of the images shown in FIG. 6. As seen in FIG. 9, selection of one of these images focuses the stroke entry more narrowly on a part of the database that will yield a quicker result and also can be helpful to users who can remember only a part of a particular character they wish to input.

In another embodiment, the matrix is different than a three by three matrix with keys numbered 1 through 9. A five by five matrix and a seven by seven matrix are particularly suitable for Chinese character entry. Larger matrices can provide the location of the stroke within the imaginary character box assumed when writing Chinese characters.

In another embodiment, incomplete characters are shown often along with complete characters after each stroke entry. This allows the user to further narrow the search for the desired character with each additional stroke entered. Complete characters and incomplete characters are ranked for selection according to their relative frequencies of use. Incomplete character images may reflect only the strokes entered, or, where possible, will show more strokes than have yet been entered.

Scope of the Invention

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. Although subsection titles have been provided to aid in the description of the invention, these titles are merely illustrative and are not intended to limit the scope of the present invention. In addition, while the above description of this invention has been in the context of Chinese characters, telephones, telephone keypads, soft keys on computer displays and matrices of specific sizes, one skilled in the art would be able to implement the present invention in other text input applications.

It is therefore intended that the following appended claims be interpreted as including all such alterations, modifications, permutations, and substitute equivalents as falling within the true spirit and scope of the present invention.

The invention claimed is:

1. A method of entering a Chinese character into a computer by entering each stroke with which the Chinese character is constructed by a plurality of presses of one or more of a plurality of keys located within a matrix of keys, the method comprising:

indicating the shape and relative sizes of each entered stroke of the character being entered by the relative locations and the sequence of the plurality of presses of one or more of the plurality of keys located within the matrix of keys;

wherein the sequence of the plurality of presses is determined by the movements traditionally made when manually constructing the stroke with a writing instrument, and wherein the Chinese character being entered is displayed for selection when enough strokes have been entered.

2. The method of claim 1 wherein the matrix of keys is the keys numbered 1 through 9 on a telephone keypad.

3. The method of claim 1, wherein the same key of the matrix is used for the first key press of a plurality of presses of one or more keys for entry of strokes that start straight downward and for strokes that start toward the right, a different key of the matrix is used for the first key press of a plurality of presses of one or more keys for entry of strokes of that start upward, and another different key of the matrix is used for the first key press of a plurality of presses for entry of strokes that start toward the left.

4. The method of claim 3 wherein the key used on a telephone keypad as the first key press of a plurality of presses of one or more keys for entry of strokes that start straight downward and for strokes that start toward the right is the key at the top left of the matrix.

5. The method of claim 4 wherein the matrix is a telephone keypad and the key at the top left of the matrix provided by numbers 1 to 9 of the telephone keypad is the '1' key.

6. The method of claim 1 wherein the presses of one or more of a plurality of keys indicate a stroke lying within a particular part of the character.

7. The method of claim 1 wherein the matrix is a 3×3 matrix.

8. The method of claim 1 wherein the matrix is a 5×5 matrix.

9. The method of claim 1 wherein the matrix is a 7×7 matrix.

* * * * *